(12) United States Patent
Payton et al.

(10) Patent No.: US 7,612,324 B1
(45) Date of Patent: Nov. 3, 2009

(54) DISTRIBUTED DISPLAY COMPOSED OF ACTIVE FIDUCIALS

(75) Inventors: David Payton, Calabasas, CA (US); Mike Daily, Thousand Oaks, CA (US); Mike Howard, Westlake Village, CA (US); Craig Lee, Redondo Beach, CA (US)

(73) Assignee: HRL Laboratories, LLC, Malibu, CA (US)

( * ) Notice: Subject to any disclaimer, the term of this patent is extended or adjusted under 35 U.S.C. 154(b) by 806 days.

(21) Appl. No.: 11/080,053

(22) Filed: Mar. 14, 2005

Related U.S. Application Data

(63) Continuation of application No. 09/967,325, filed on Sep. 27, 2001, now abandoned.

(60) Provisional application No. 60/235,599, filed on Sep. 27, 2000.

(51) Int. Cl.
*H01J 40/14* (2006.01)
*G05B 19/00* (2006.01)

(52) U.S. Cl. .................. 250/221; 700/248; 700/258; 901/46

(58) Field of Classification Search ............. 700/248, 700/258, 259, 19; 901/46, 47; 250/208.1, 250/221, 222.1
See application file for complete search history.

(56) References Cited

U.S. PATENT DOCUMENTS

| | | | |
|---|---|---|---|
| 4,028,533 A | 6/1977 | Matsubara | |
| 4,887,223 A * | 12/1989 | Christian | .............. 382/153 |
| 5,233,604 A | 8/1993 | Ahmadi et al. | |
| 5,561,790 A | 10/1996 | Fusaro | |
| 5,675,741 A | 10/1997 | Aggarwal et al. | |
| 5,728,965 A | 3/1998 | Fesland et al. | |
| 5,801,970 A | 9/1998 | Rowland et al. | |
| 5,946,083 A | 8/1999 | Melendez et al. | |

(Continued)

FOREIGN PATENT DOCUMENTS

DE   4218599 A   12/1993

(Continued)

OTHER PUBLICATIONS

Azuma, R., et al., "A Motion-Stabilized Outdoor Augmented Reality System," Proceedings of IEEE VR '99, Houston, TX, pp. 252-259, Mar. 1999.

(Continued)

*Primary Examiner*—Kevin Pyo
(74) *Attorney, Agent, or Firm*—Tope-McKay & Assoc.

(57) ABSTRACT

An apparatus configured to obtain, process, and relay data to a user in a coherent and useful manner. An active fiducial is equipped with an interface for receiving and transmitting data. The fiducial may transmit its position using a satellite-based position sensing device such as a GPS. Active fiducials may also be equipped with battery power pack regenerated with solar cells. Similarly, the fiducials can be equipped with at least one video camera or other device having a focal plane array and a computer software system, configured to recognize shapes. The fiducials may also be equipped with inductive coils or other means for sensing metal containing compounds. The active fiducials may be equipped with a gas chromatograph. The active fiducials may use a variety of propulsion means including motor driven tracks, motor driven wheels, propellers, or other device or a combination of devices.

27 Claims, 5 Drawing Sheets

U.S. PATENT DOCUMENTS

| | | | |
|---|---|---|---|
| 5,991,300 A | | 11/1999 | Tappan |
| 6,154,139 A | | 11/2000 | Heller |
| 6,160,371 A | * | 12/2000 | Tachikawa ............. 318/568.11 |
| 6,195,020 B1 | | 2/2001 | Brodeur, Sr. et al. |
| 6,208,247 B1 | | 3/2001 | Agre et al. |
| 6,311,129 B1 | | 10/2001 | Lin |
| 6,577,906 B1 | * | 6/2003 | Hurtado et al. ................ 700/2 |
| 6,675,040 B1 | * | 1/2004 | Cosman ...................... 600/427 |

FOREIGN PATENT DOCUMENTS

| | | | |
|---|---|---|---|
| FR | | 2759775 A | 8/1998 |

OTHER PUBLICATIONS

Azuma, R., et al. , "Recent Advances in Augmented Reality," IEEE Computer Graphics and Applications vol. 21, #6, pp. 34-47, Nov./Dec. 2001.

Cassinis, R. "Landmines Detection Methods Using Swarms of Simple Robots", Proc. of 6th Int'l Conf. on Intel. Auton. Sys. (IAS2000), Venice, Italy, Jul. 25-27, 2000.

Cho, Y., "Multiring Fiducial Systems for Scalable Fiducial-Tracking Augmented Reality," Presence: TeleOperators and Virtual Environments, Dec. 2001.

Flynn, A.M., "Gnat Robots," Proc. of IEEE Microro. and Teleop. Wrks., Hyannis, MA, Nov. 1987. Also in AI Expert, Dec. 1987, pp. 34 et seq.

Gage, D.W. "Command Control for Many-Robot Systems," In 19th An. AUVS Tech. Symp. (AUVS-91), Huntsville AL, Jun. 22-24, 1992. Also in Unmanned Sys. Mag., 10(4):28-34.

Gage, D.W. "Sensor Abstractions to Support Many-Robot Systems," In Proceedings of SPIE Mobile Robots VII, Boston, MA, vol. 1831, pp. 235-246, 18-20, 1992.

Gage, D.W. "How to Communicate with Zillions of Robots," In Proceedings of SPIE Mobile Robots VIII, Boston, MA, vol. 2058, pp. 250-257, 9-10, 1993.

Lewis, M.A., et al. "The Behavioral Self-Org. of Nanorobots Using Local Rules," Proc. of 1992 IEEE/RSJ Int'l Conf. on Intel. Robots and Sys., Raleigh, NC, Jul. 7-10, 1992.

Milgram, P., et al, "Applications of augmented reality for humanrobot communication", Proc. IEEE/RSJ Int'l Conf. on Intelligent Robots & Systems (IROS), Yokohama, 1993.

Milgram P, et al "Telerobotic control using augmented reality". Proc. 4th IEEE Intn'l Workshop Robot & Human Commun. (Ro-Man'95), Tokyo, pp. 21-29, Jul. 1995.

Payton, D.W. "Internalized Plans: A Rep. for Action Resources, in Designing Autonomous Agents," ed. Pattie Maes, MIT Press, Cambridge, Mass, pp. 89-103, 1990.

Payton, D., M. Daily, R. Estowski, M. Howard, C. Lee, "Pheromone Robots", in Autonomous Robots, Kluwer Academic Publishers, Boston, MA, 9(8), 2001.

Payton, D., et al "Autonomy-Oriented Computation In Pheromone Robots", Workshop on Autonomy Oriented Computing, Autonomous Agents 2001 Conf., Montreal, Canada, May 2001.

D.W. Gage, "Many-Robot Systems," SPAWAR Systems Center, San Diego, Dec. 2000.

* cited by examiner

DISTRIBUTED DISPLAY COMPOSED OF ACTIVE FIDUCIALS

CROSS-REFERENCE TO RELATED APPLICATIONS

This application is a continuation of U.S. application Ser. No. 09/967,325, filed Sep. 27, 2001 now abandoned, and titled "Distributed Sensing Apparatus and Method of Use Therefor." This application claims the benefit of priority to U.S. application Ser. No. 09/967,325 which claims the benefit of priority to provisional application No. 60/235,599, now expired, filed in the United States on Sep. 27, 2000, and titled "Distributed Display Composed of Active Fiducials".

STATEMENT OF GOVERNMENT RIGHTS

Portions of this invention was made or used in conjunction with U.S. Government support from the Defense Advanced Research Projects Agency, under Contract No. N66001-99-C-8514. The U.S. Government may have certain rights in this invention.

TECHNICAL FIELD

The present invention relates generally to an apparatus and a method configured to provide a user with data collected from multiple sources.

BACKGROUND OF THE INVENTION

Conventional approaches to displaying information from multiple sensors require a map of the environment to which the information pertains and data regarding the coordinates of each sensor. Generally data from each sensor is obtained and compiled by way of a user interface, and the data is then displayed relative to a map in the possession of a user. The data may be superimposed onto the map at locations corresponding to the position of each sensor.

Drawbacks to these approaches include the requirement of a coordinate system that allows a correspondence between features on the map and features in the environment. Further, the position of each sensor must be known relative to the map. Accordingly, the position of each sensor is generally indexed within the coordinate system so that the relative position of each sensor is known and, thereby, the relevance of the data obtained by each particular sensor can then be ascertained.

There are numerous instances where a user is either unable to obtain a map of the environment, or is unable to obtain a map that is accurate enough to facilitate the coordination of gathered data with the map.

Therefore, it would be desirable to have a means for obtaining data from the environment whereby the data could be coordinated with the sites of data collection without the need for a map.

SUMMARY OF THE INVENTION

The present invention overcomes the limitations of the prior art by providing an apparatus and method for obtaining data from an environment wherein the data are associated with the data collection sites without the need for a map of the environment.

This present invention provides a means for providing location-specific information to a user from a collection of distributed data sensors. The sensors will herein be referred to as "active fiducials", robots, and sensors.

One embodiment of the present invention provides A distributed display apparatus comprising: a plurality of active fiducials, each fiducial comprising: a sensor; a data processing element attached with the sensor, wherein the sensor is configured to receive sensor data and provide the sensor data to the data processing element, whereby the data processing element processes the sensor data, outputting processed data; and a transmitter connected with the data processing element, wherein the transmitter is configured to transmit the processed data from the active fiducial; and a receiving unit comprising: a first receiver for receiving the processed data transmitted from the plurality of active fiducials; a second receiver for receiving surrounding data from an area surrounding the plurality of active fiducials; and an augmented view device for overlaying the processed data received from the plurality of active fiducials with the surrounding data from the area surrounding the plurality of active fiducials.

Another embodiment of the present invention provides a method for displaying comprising acts of: deploying a plurality of active fiducials, each fiducial capable of performing acts of: processing data received from a sensor, resulting in processed data; and transmitting the processed data; and receiving the processed data at a specified location; receiving surrounding data from an area surrounding the plurality of active fiducials; and overlaying the processed data received from the plurality of active fiducials with the surrounding data from the area surrounding the plurality of active fiducials.

Another embodiment provides A method for displaying comprising acts of: deploying a plurality of active fiducials, each fiducial capable of performing acts of: processing data received from a sensor, resulting in processed data; and transmitting the processed data such that a coordinated image is obtained by viewing multiple active fiducials simultaneously.

BRIEF DESCRIPTION OF THE DRAWINGS

The accompanying drawings form a part of the specification, and illustrate various embodiments of the invention. The drawings, taken together with the description, serve to explain the principles of the invention.

DETAILED DESCRIPTION

The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein. Furthermore it should be noted that, unless explicitly stated otherwise, the figures included herein are illustrated diagrammatically and without any specific scale, as they are provided as qualitative illustrations of the concept of the present invention.

The present invention provides a method and apparatus whereby one or more active fiducials locate and gather data that is then provided to a user. More specifically, the present invention described herein contemplates numerous configurations in order to accomplish the tasks of locating and obtaining relevant information about a target based upon instructions provided to one or more active fiducials by a user.

Figure 1:
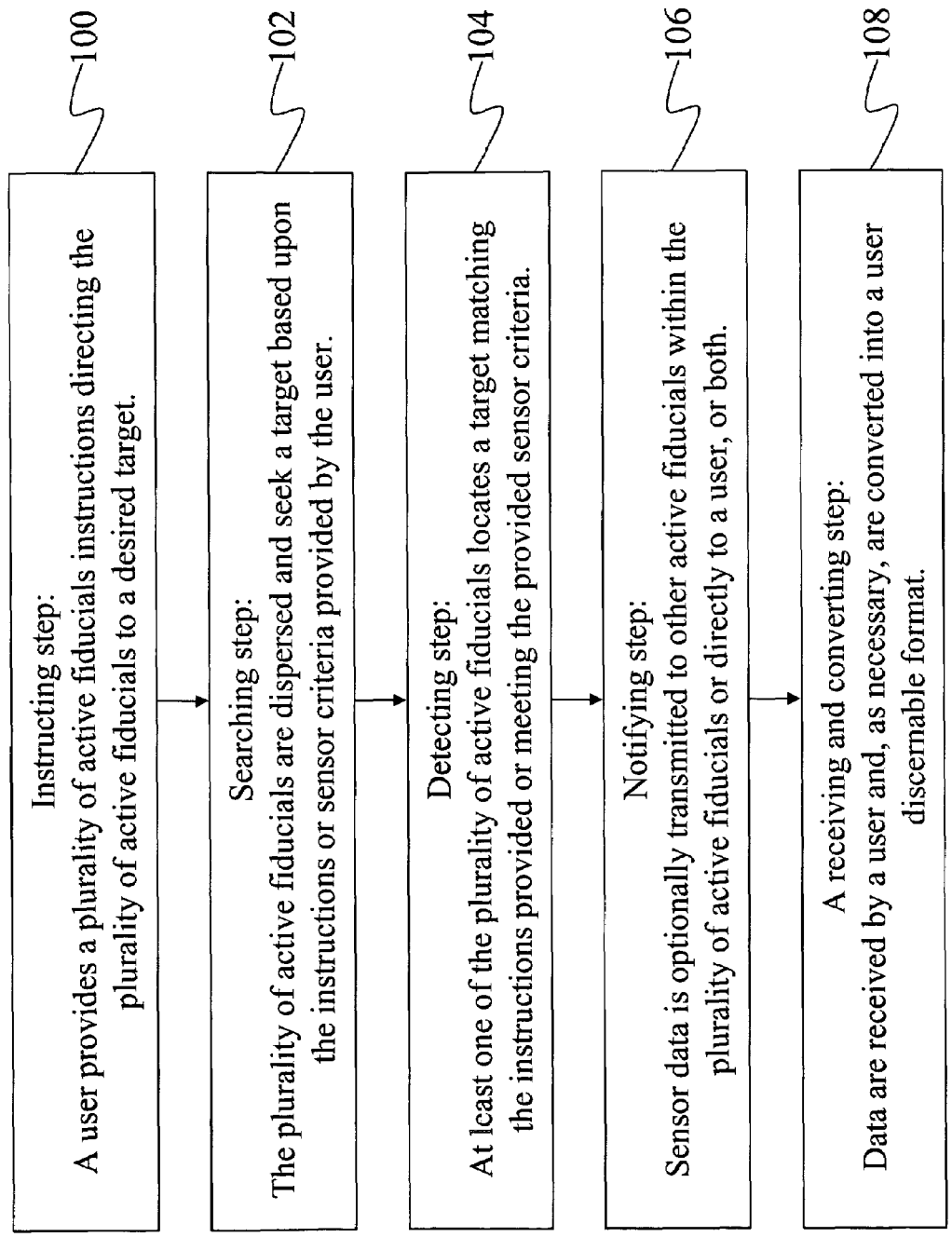
FIG. 1 is a flowchart depicting a method whereby a user first instructs the active fiducials to locate a target based upon criteria provided by the user.

The flowchart shown in FIG. 1 outlines one embodiment of the present invention, whereby data regarding a target is obtained, processed, and relayed to a user in a coherent and useful manner. According to this embodiment, there is at least one user and a plurality of active fiducials. Accordingly, there is an instructing step 100, whereby a user provides the plurality of active fiducials with instructions or sensor criteria in order to direct the plurality of active fiducials to a desired target. These instructions may be permanently fixed, or may be varied either by an end user or an intermediate user. Where an end user refers to a final user and an intermediate user may refer to an entity that either retransmits data, or uses collected data as a means to draw conclusions, or make decisions, before the data is routed to the end user. For example, the fiducials may be employed to help detect incipient forest fires. In this case the fiducials sensors would be programmed to seek out certain heat sources. Upon finding such a heat source the discovering fiducial will relay a message to the user, either through other intermediate fiducials or directly to an end user, such as a forest ranger. The fiducial may transmit its position using a satellite based position-sensing device such as GPS, or by providing its direction to either other fiducials or directly to the user. Thus if a plurality of active fiducials were released into a forest they may be permitted to wander about indefinitely, possibly using a solar power pack, in search of forest fires. Similarly, the fiducials could be configured to look for certain shapes, using commonly available video cameras and shape identification software. Thus the fiducials may find application in crime scene investigations, by searching fields or buildings for instruments of the crime. The fiducials could also search for metal containing compounds, such as weapons or land mines, or even toxic substances. A simple gas chromatograph could draw air and water samples and test for the presence of certain chemicals in situ. According to the method of this embodiment, a searching step 102 is performed next, whereby the plurality of active fiducials are dispersed in order to seek a target based upon the instructions or sensor criteria provided by the user. The third step 104 is a detecting step, wherein at least one of the plurality of active fiducials locates a target matching the provided instructions or meeting the provided sensor criteria. The fourth step 106 is a notifying step, wherein the sensor data is optionally transmitted from the inter-fiducial interface to other active fiducials within the plurality of active fiducials or directly to a user, or both. The fifth step 108 includes a receiving and converting step, wherein data are received by a user and, as necessary, are converted into a user discernable format. In the present embodiment, the data relayed by the active fiducials may be sent to other active fiducials to optimize or modify their searches and/or data acquisition.

Figure 2:
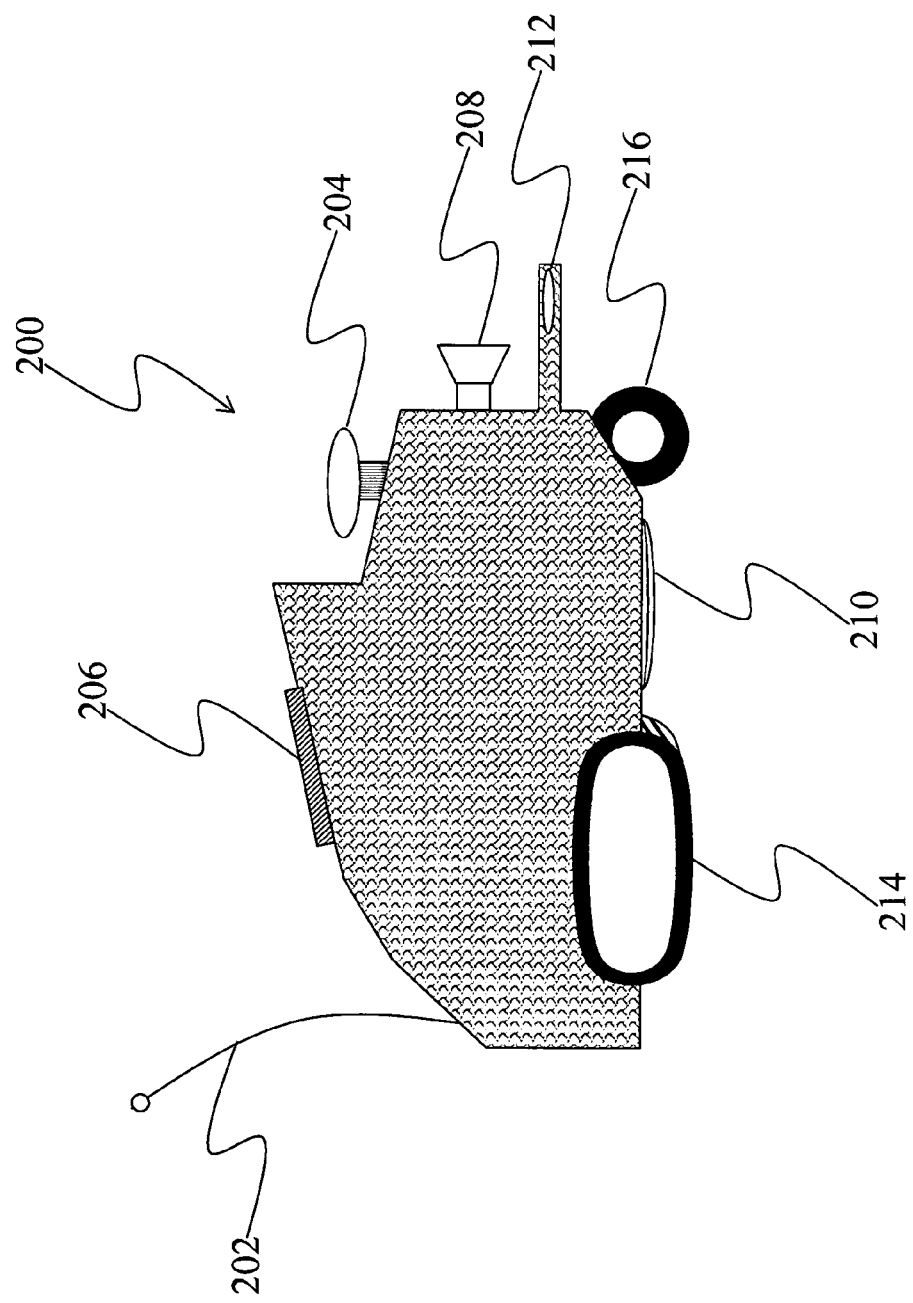
FIG. 2 is a depiction of one embodiment of an active fiducial according to the present invention.

Another embodiment of the present invention provides an apparatus configured to obtain, process, and relay data to a user in a coherent and useful manner. According to this embodiment, as depicted in FIG. 2, each active fiducial 200 is equipped with an interface for receiving data and transmitting data, wherein the data is understood to include instructions, sensor criteria, sensor reports, and other transceived data. Instructions may relate to the dispersion pattern that the robots are to take, sensor criteria would include both what to look for, and ideally at what level. Thus, travel due north and report when the ambient concentration of oxygen goes 12 percent. The sensor reports might include a report stating that the ambient concentration of oxygen is 7 percent, and include the fiducial's coordinates. This data interface may include a remote receiving module 202 or another type of interface. Instructions and sensor criteria can be permanently programmed into the active fiducials, or may be varied either by the end user or an intermediate user. For example, the fiducials may be employed to help detect incipient forest fires. In this case the fiducials sensors would be programmed to seek out certain heat sources. Upon finding such a heat source the discovering fiducial will relay a message to the user, either through other fiducials or directly to the user. The fiducial may transmit its position using a satellite-based position sensing device, or by providing its direction to either other fiducials or directly to the user. In the case where directions are provided using a satellite based position sensing device the active fiducial will be equipped with a GPS receiver 204 or equivalent system. Similarly if a radio beacon system is utilized in place of a GPS, the fiducial would need to be equipped with the appropriate technology. The active fiducials may also be equipped with battery power pack regenerated with solar cells 206. Similarly, the fiducials can be equipped with at least one video camera 208 and a computer software system, configured to recognize shapes, in all cases the active fiducial is defined to include a data processor. The fiducials may also be equipped with inductive coils 210 or other means for sensing metal containing compounds. Additionally the fiducial may be equipped with a gas chromatograph 212, configured to sample air or water and test for the presence of certain chemicals in situ. Sensors need not be statically mounted to the active fiducials. It is anticipated, and in some cases preferred, that the sensors can change position on the active fiducials. The video camera 208 could be mounted on a turret to allow for a wide view range. The active fiducial is intended to accommodate virtually any sensor or array of sensors. Further, the active fiducials may use a variety of propulsion means including motor driven tracks 214, motor driven wheels 216, propellers, lighter than air reservoirs, such as hot air balloons of dirigibles, or other propulsion device or a combination of devices. The propulsion device will generally be coupled to a steering mechanism, which, may be controlled, by user input, a "smart" algorithm or similar artificial intelligence protocol, or pre-specified directions such as a compass/GPS heading or by a trial and error random walk, wherein the active fiducials travel until their progress is sufficiently inhibited and then retreat. The active fiducial often will simply be a sensor allowed to statically remain in place, or move when acted upon by environmental forces. In such a situation the fiducial would not have any propulsion means. The active fiducials communicate with the user either directly or through at least one other active fiducial. The means of communication may either be by conventional radio waves, or other bands within the electromagnetic radiation range, visible or not. Additionally the active fiducial may use electromechanical radiation, either alone or in conjunction with electromagnetic radiation. The active fiducials may also be attached to mobile objects such as motorized vehicles, planes or animals. Such an embodiment may be equipped with adhesive, a cord or wire or a magnetic adhesion device or other adhering device. In this way the active fiducials could be readily affixed to a plurality of mobile objects.

Figure 3:
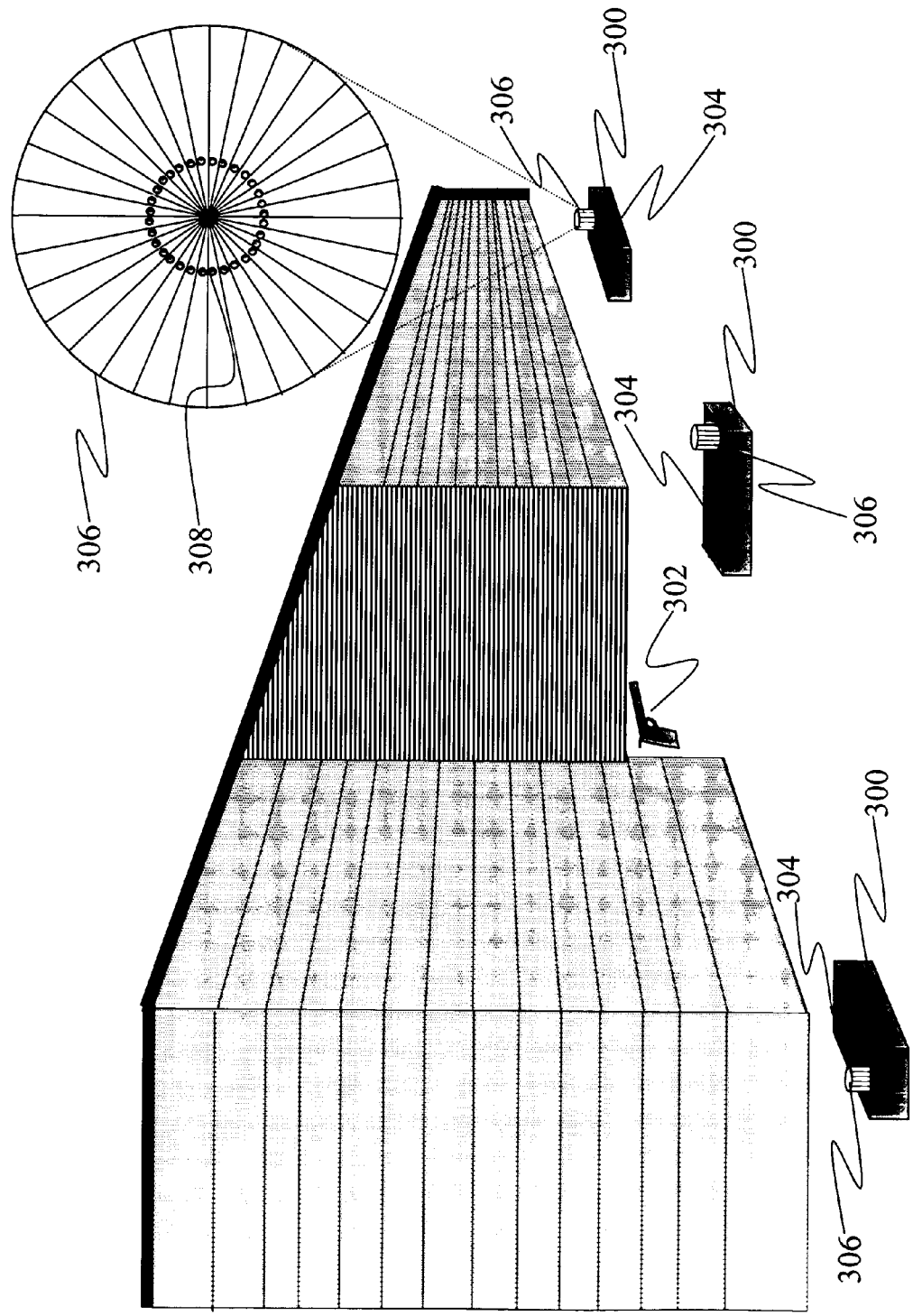
FIG. 3 is an illustration of a plurality of active fiducials in operation.

In another embodiment of the present invention, the active fiducial is configured to provide visually discernable status indicia. For instance, FIG. 3 presents a plurality of active fiducials 300 that have found an object 302 matching a specified criterion. In this case the each active fiducial is equipped with an arrow 304 and a direction-specific transceiver 306 (see outtake). Here, an active fiducial 300 has located a target 302, a gun in this case, and has transmitted its findings to surrounding active fiducials 300. Because a direction-specific transceiver 306 is utilized, each active fiducial receives information that is appropriate to its position. In this embodiment the direction-specific transceiver 306 comprises a plurality of light-emitting diodes 308, surrounded by a plurality of baffles. Each diode emits at a unique wavelength or flash pattern, and directly below or above each diode could optionally be an electromagnetic radiation sensor for directional sensing. In this embodiment there are 32 different wavelengths, or transmission patterns, thus providing an angular resolution of about 10 degrees. There could be greater or fewer wavelengths and the device could be interpreted using only the unaided eye, for example through the use of colors. In this embodiment of the present invention the user cannot see the target, such a situation exists where there is no unobstructed view, or where the subject matter is invisible, as is the case with certain types of gas, heat, or otherwise difficult to discern systems. In the present case the arrows point the user in the direction of the target, even when the target is out of sight. There is nothing exclusive about the use of arrows as indicia of direction, directional color or other characteristics could be used with comparable results. Consider the situation where red, green and yellow diodes are used to indicate a fact concerning a region. A green light could mean no hazard, a yellow light could indicate the presence a toxin above a first threshold, and a red light could indicate the presence of a toxin above a second threshold. Alternatively, the data from the fiducials can be represented as an overlay, the aggregation of the data from all the fiducials would result in a coherent distributed display of information. This display is comparable to a traditional display that is composed of a plurality of pixels, each of which is insufficient to convey the content of an image, but when taken in the aggregate form a useful image. An example of such an application would be the placement of active fiducials in the vicinity of a toxic chemical discharge. The fiducials could use pseudo-color to dynamically map toxin concentration gradients across a geographical area. Similarly, temperature or any other environmental quality could be measured.

In an alternative embodiment the light-emitting diodes are distinguishable based on a number of factors such as intensity, or if the light-emitting diode is made to have periods of alternating of illumination. In such a scenario the periodicity of illumination may be used to provide directional and substantive data. Further it is anticipated that fairly complex patterns of periodicity and varying wavelength could allow for a virtually limitless number of unique directional signals. Alternative systems could use directional radio transmitters, or directional acoustical transmitters. Additionally, laser beams could be used to provide better directional resolution. In such a case it is anticipated that the intermittency of the transmitted beam would contain, at least a portion of the coded directional component. In some situations each active fiducial within an area may be able to simultaneously provide unique localized information. Such a situation exists where toxic gases are known to exist. By placing active fiducials strategically across an area, a user could view the toxic gas concentration gradients across the area. A pseudo-color scheme could be used to depict concentration in a heads-up display or other display. Similarly, various colored light-emitting diodes could be employed across the field, where the light-emitting diode's color could indicate concentration.

Figure 4:
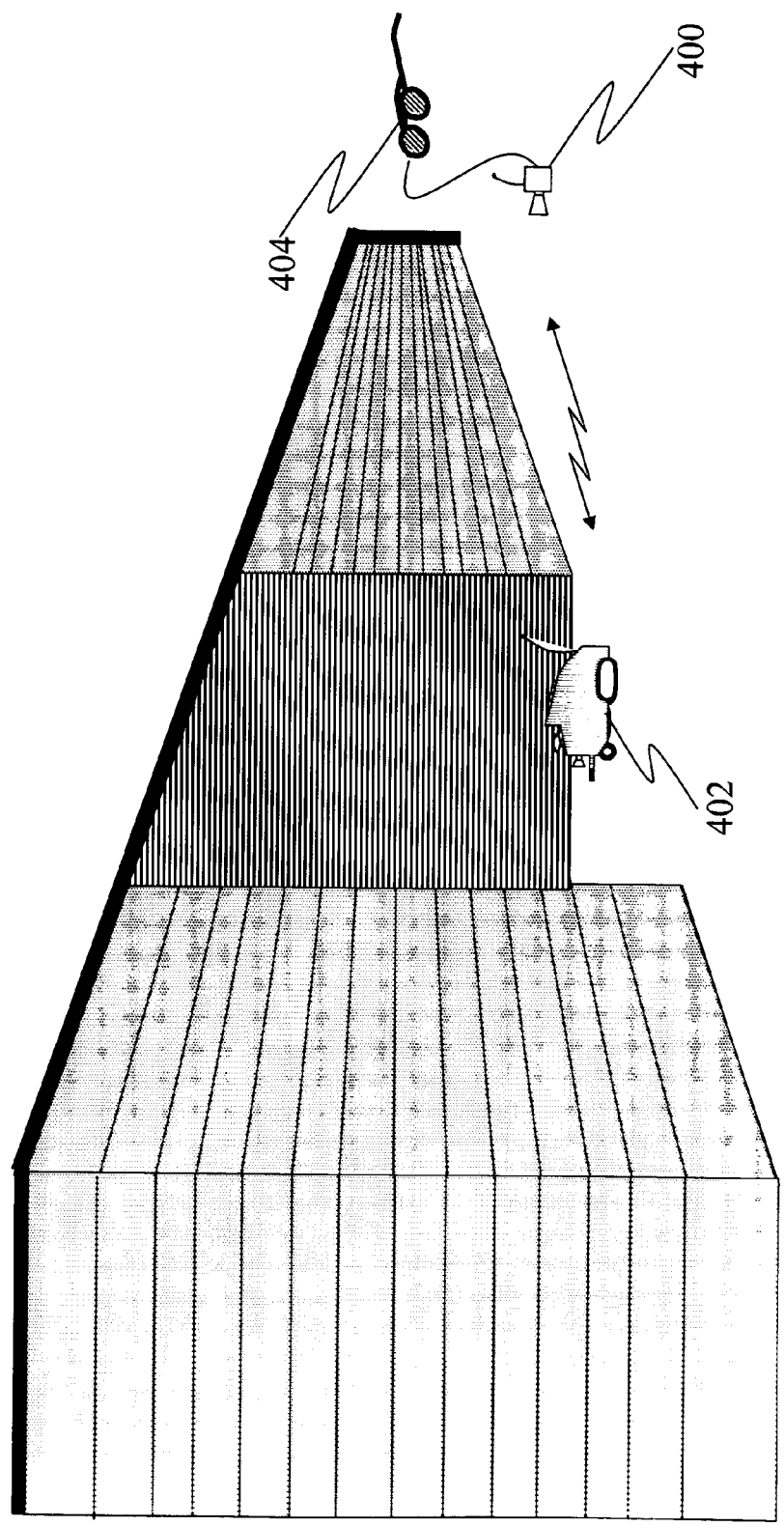
FIG. 4 is a diagram of an active fiducial unit relaying data to a user by way of a user-fiducial interface.

A diagram of a fiducial unit relaying data to a user by way of a user-fiducial interface is shown in FIG. 4. In the present embodiment of the invention, the user is holding or is wearing a receiving unit 400, which is capable of receiving and interpreting the data from an active fiducial 402. The converted data is put into a form recognizable by a user and provided to a user. In this case the data is displayed on a pair of glasses 404 which are substantially transparent except for the selective placement of fiducial related data. For the purposes of this application this will be considered a heads-up display. The relevant information can be relayed to the user in numerous other ways such as a video display or monitor or audio signal having a variable intensity or tone.

Figure 5:
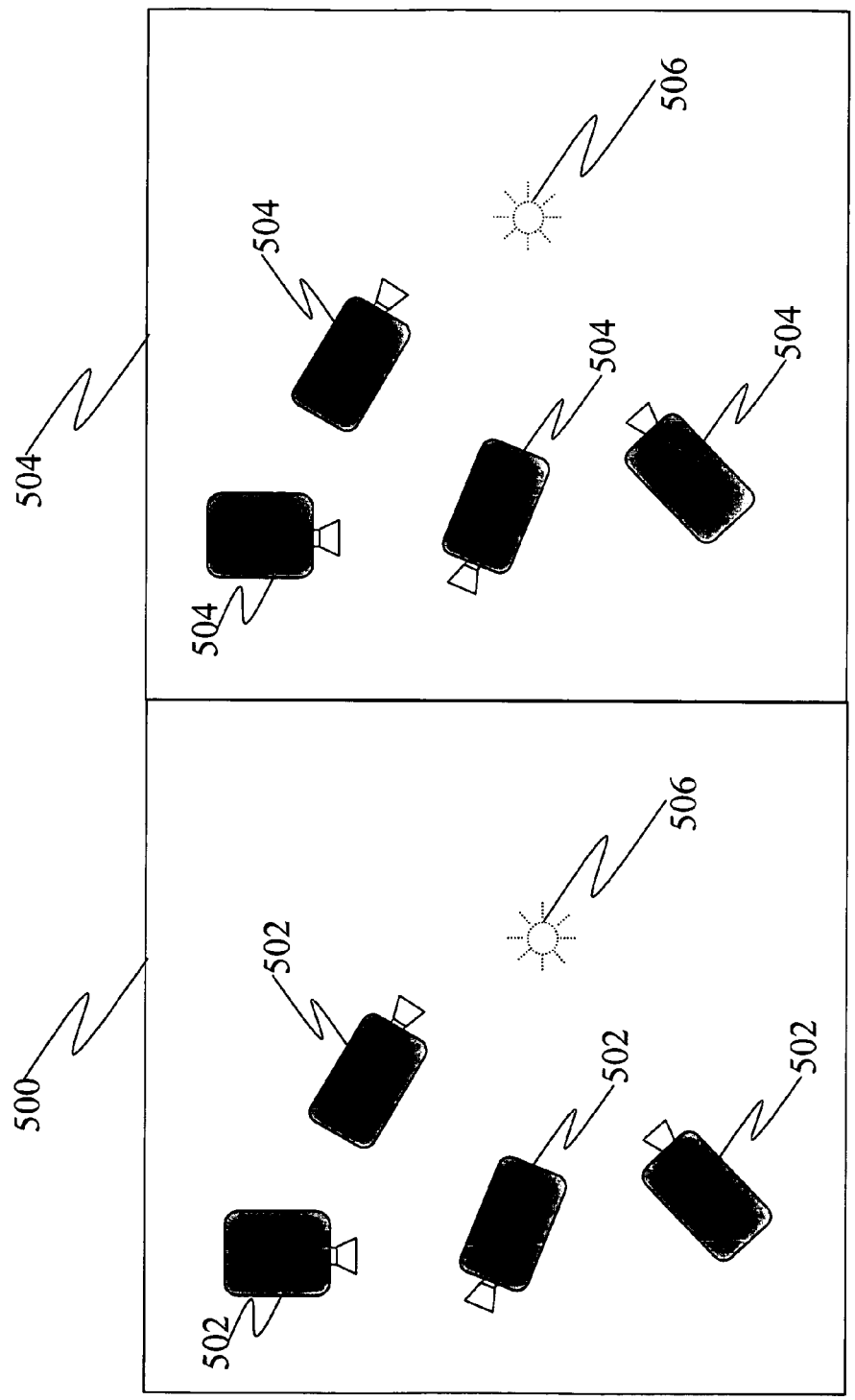
FIG. 5 is a split view of a plurality of active fiducials, indicating an unaided view and an augmented view in the case where a target is not discernable to a user.

In another embodiment of the present invention, the transceiver transmits using electromagnetic radiation outside the visible region, such as radio frequency, infrared light, microwave, etc. The user then utilizes a receiver to decode the signals and displays the directional data or other data. The data may be in the form of an overlay on a heads-up display, an augmentation of a video feed, a display on a screen, such as a laptop, CRT, other display, or other mode of data conveyance. Such an embodiment is provided in FIG. 5. The non-augmented view 500 in this embodiment shows only the active fiducials 502 in a specific location. However, with the aid of an augmented view 504, the user further sees the desired additional data regarding the position of the target 506.

Yet another embodiment provides an active fiducial comprising a means for obtaining information. In this embodiment the means may be either a receiver, configured to collect data from one or more other active fiducials, or it may be a sensor as discussed earlier. If a sensor is used the sensor is configured to not only collect data, but to provide the data to a sensor interface, so that the collected data may be made available to a user, either directly or through another active fiducial. According to this embodiment there is also a means for conveying information to a user, this means could include any means of data conveyance, including the use of reflected light. Thus, the active fiducial may display a non-illuminated sign, or an illuminated sign or any other data conveyance means. Further, this embodiment envisions an implicit means for conveying apparatus location identification. The most obvious example is an active fiducial in plain sight. This means of location providing information relies on the ability of the user to ascertain the location of the active fiducial based on the perception of the user. In more complex systems the active fiducial may be concealed to the naked eye but visible with the aid of an optical device. Thus, the user will extract an essential element of information by visually perceiving the active fiducials, even if the perception is accomplished with the aid of a user operated device.

It is anticipated that the active fiducial will rely on at least one means for conveying a signal. A non-exhaustive list might include an omni-directional electromagnetic radiation originating transmitter. Such a transmitter would include a transmitter configured to transmit in virtually any spectrum of the electromagnetic radiation region. Thus a light transmission and a radio transmission would be anticipated. In this case the active fiducial would actually power the transmitter. In another version the active fiducial may use ambient energy to transmit a signal. An example would be the situation where sunlight is allowed to impinge on an object, and be reflected to a user. The reflected light would provide a signal to the user. A pointing arrow or other data indicia would be included in this embodiment. The electromagnetic radiation emanating form the active fiducial, either originating or being reflected, can be either visible from only one general direction or visible form a plurality of directions. Additionally the active fiducial may utilize audio signals either within or out of the range perceptible by humans.

What is claimed is:

1. A distributed display apparatus comprising:
    a plurality of active fiducials, each with a fiducial position, each fiducial comprising:
        a sensor;
        a data processing element attached with the sensor, wherein the sensor is configured to receive sensor data and provide the sensor data to the data processing element, whereby the data processing element processes the sensor data, outputting processed data; and
        a transmitter connected with the data processing element, wherein the transmitter is configured to transmit the processed data from the active fiducial to a receiving unit;
    the receiving unit comprising:
        a first receiver for receiving the processed data transmitted from the plurality of active fiducials; and
        an augmented view device that is co-located with the first receiver, the augmented view device having a display with a field-of-view configured such that the processed data received from the plurality of active fiducials is overlaid on the display in correspondence with each fiducial position within the field-of-view.

2. The distributed display apparatus of claim 1, wherein the sensor of an active fiducial is configured to receive the processed data from another active fiducial.

3. The distributed display apparatus of claim 1, wherein the receiving unit is operable for receiving surrounding data from an area surrounding the active fiducial, with the augmented view device displaying the processed data such that the processed data is overlaid over the surrounding data from the area surrounding the plurality of active fiducials.

4. The distributed display apparatus of claim 1, wherein the active fiducial further comprises a second sensor configured to receive the processed data from another active fiducial.

5. The distributed display apparatus of claim 1, wherein the sensor data includes information selected from a group consisting of: temperature, shapes, metal composition, and chemical substances.

6. The distributed display apparatus of claim 1, wherein the transmitter is a status indicator, and wherein an orientation from the receiving unit to the status indicator is determinable by the receiving unit.

7. The distributed display apparatus of claim 1, wherein the transmitter is a direction-specific transmitter which transmits information such that the first receiver receives different information depending on an orientation of the first receiver with respect to the direction-specific transmitter.

8. The distributed display apparatus of claim 7, wherein the transmitter comprises a plurality of light-emitting diodes, wherein at least one of the plurality of light-emitting diodes projects light in a different direction than others of the plurality of light-emitting diodes.

9. The distributed display apparatus of claim 8, wherein at least one of the plurality of light-emitting diodes incorporates a baffle for directing the light from at least one of the plurality of light-emitting diodes.

10. The distributed display apparatus of claim 8, wherein each diode of the plurality of light-emitting diodes emits a unique wavelength or flash pattern.

11. The distributed display apparatus of claim 1, wherein the augmented view device is a heads-up display.

12. The distributed display apparatus of claim 1, wherein at least one of the plurality of active fiducials further comprises a propulsion device.

13. The distributed display apparatus of claim 12, wherein at least one of the plurality of active fiducials further comprises a user interface, whereby a user may utilize the user interface to provide instructions to the active fiducial via the data processing element.

14. A method for displaying comprising acts of:
    deploying a plurality of active fiducials, each fiducial having a fiducial position and being capable of performing acts of:
        processing data received from a sensor, resulting in processed data; and
        transmitting the processed data; and
    receiving the processed data at a specified location with a receiving unit;
    receiving surrounding data from an area surrounding the plurality of active fiducials with an augmented view device having a field-of-view and a display that is co-located with the receiving unit; and
    overlaying the processed data received from the plurality of active fiducials with the surrounding data from the area surrounding the plurality of active fiducials on the display such that the processed data is overlaid on the display in correspondence with each fiducial position within the field-of-view.

15. The method of claim 14, wherein the act of processing data received from a sensor further comprises an act of processing data received from another active fiducial.

16. The method of claim 14, wherein the act of processing data received from a sensor further comprises an act of processing data received from the area surrounding the active fiducial.

17. The method of claim 16, wherein the act of processing data received from a sensor further comprises an act of processing data received from another active fiducial.

18. The method of claim 14, wherein the act of act of receiving the processed data at a specified location further comprises an act of determining an orientation of the active fiducial relative to the specified location.

19. The method of claim 14, wherein the act of transmitting the processed data further comprises an act of transmitting different processed data in different directions.

20. The method of claim 19, wherein the act of transmitting different processed data in different directions further comprises an act of transmitting a symbol having an orientation, wherein the orientation of the symbol is dependent upon the direction in which the processed data is transmitted.

21. The method of claim 20, wherein the act of transmitting a symbol further comprises an act of transmitting an arrow, wherein the orientation of the arrow indicates a direction to an object within the surrounding area.

22. The method of claim 14, wherein the act of transmitting the processed data further comprises an act of limiting the direction in which the data is transmitted.

23. The method of claim 22, wherein the act of transmitting processed data further comprises an act of selectively passing light via one of a plurality of baffles.

24. The method of claim 23, wherein at least one of the plurality of active fiducials emits light at a different wavelength or flash pattern from that of another of the plurality of active fiducials.

25. The method of claim 14, wherein the act of receiving data from an area comprises an act of viewing, through human eyes, the area, and the act of receiving the processed data at a specified location further involves an act of utilizing a heads-up display.

26. The method of claim 14, wherein at least one of the plurality of active fiducuals is capable of performing an act of moving.

27. The method of claim 14, further comprising an act of utilizing a user interface to provide instructions to the active fiducials.

\* \* \* \* \*